US007417631B2

(12) United States Patent
Starkweather

(10) Patent No.: US 7,417,631 B2
(45) Date of Patent: Aug. 26, 2008

(54) REFLECTIVE DISPLAYS WITH COLOR FILTER CROSS-TALK COMPENSATION

(75) Inventor: Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 11/214,168

(22) Filed: Aug. 29, 2005

(65) Prior Publication Data

US 2005/0280619 A1 Dec. 22, 2005

Related U.S. Application Data

(63) Continuation of application No. 10/959,290, filed on Oct. 6, 2004, now Pat. No. 7,027,019, which is a continuation of application No. 09/925,899, filed on Aug. 9, 2001, now Pat. No. 6,806,856.

(51) Int. Cl.
*G06F 3/038* (2006.01)
*G09G 5/00* (2006.01)

(52) U.S. Cl. ...................................................... 345/207

(58) Field of Classification Search ................... 345/88, 345/87, 58, 204, 690, 589, 593, 102, 600–603
See application file for complete search history.

(56) References Cited

U.S. PATENT DOCUMENTS

| | | | | |
|---|---|---|---|---|
| 3,922,711 | A | 11/1975 | Sasabe et al. | 358/75 |
| 4,875,032 | A * | 10/1989 | McManus et al. | 345/603 |
| 5,301,017 | A | 4/1994 | Murakami | 348/645 |
| 5,428,720 | A * | 6/1995 | Adams, Jr. | 345/603 |
| 5,555,114 | A | 9/1996 | Narita et al. | 359/65 |
| 6,630,918 | B2 * | 10/2003 | Kao et al. | 345/690 |
| 6,806,856 | B2 | 10/2004 | Starkweather | 345/88 |
| 6,819,306 | B1 * | 11/2004 | Cooper | 348/602 |
| 7,006,710 | B2 * | 2/2006 | Riley et al. | 382/294 |
| 2003/0011616 | A1 | 1/2003 | D'Souza et al. | 345/600 |

* cited by examiner

*Primary Examiner*—Sumati Lefkowitz
*Assistant Examiner*—William L Boddie
(74) *Attorney, Agent, or Firm*—Woodcock Washburn LLP

(57) ABSTRACT

A color filter cross-talk compensator is provided for a multi-color reflective display system having a controllable display cell with multiple adjacent color filters that transmit generally different components with overlaps between them, ambient light being transmitted into the display cell and reflected back through it. The color filter cross-talk compensator receives image data that correspond to a display image to be rendered and generates cross-talk compensated color component drive signals that are delivered to the display cell (e.g. L.C.D). The cross-talk compensated color component drive signals compensate for the overlapping color components transmitted by the color filters for the different color components. A color filter cross-talk compensation method is also provided.

17 Claims, 3 Drawing Sheets

REFLECTIVE DISPLAYS WITH COLOR FILTER CROSS-TALK COMPENSATION

CROSS-REFERENCE TO RELATED APPLICATIONS

This application is a continuation of co-pending U.S. patent application Ser. No. 10/959,290 filed Oct. 6, 2004, which is a continuation of U.S. patent application Ser. No. 09/925,899 filed Aug. 9, 2001. The content of each is hereby incorporated herein by reference in its entirety.

FIELD OF THE INVENTION

The following relates to reflective flat panel display systems and, in particular, to improving color characteristics of display images rendered by such systems.

BACKGROUND OF THE INVENTION

Flat panel systems include controllable display cells, such as liquid crystal display cells, that impart image information onto light transmitted from a light source. The light passes through the display cell to an analyzer (e.g., a polarizer) that resolves the light into a display image that is provided at a display output.

Transmissive display systems include a high-intensity backlight that functions as the light source and cooperates with the display cells to provide a reasonably high brightness display. Such display systems are employed in a variety of electronic devices including, for example, portable personal computers and other computing devices. Such electronic devices in portable operation rely upon a battery power source, and the current draw of a high-intensity backlight imposes a severe limit on the duration of battery-powered portable operation.

Reflective display systems, including high-resolution, multicolor reflective display systems, utilize ambient light to generate display images. No backlight is used. Ambient light received at the viewing surface of a reflective display system passes through a display cell to a reflector, and is reflected back through the display cell to the viewer with an imparted display image. Electronic devices such as portable computers with reflective display systems avoid the battery-powered operating time limitations characteristic of devices with transmissive display systems.

Without a high-intensity backlight, a reflective display system will typically be designed to maximize the amount of ambient light that can be used to maximize the display brightness. In a multicolor display with color filters for generating multiple primary color components (e.g., red, green, and blue), the spectral ranges of light transmitted by each color filter are typically maximized. This can result in significant overlaps in the spectral ranges transmitted by the nominal color filters for the different primary color components.

While improving display brightness, such overlaps in color filter spectral ranges can decrease the accuracy with which colors are rendered by a reflective display system. In particular, overlapping spectral ranges means that pure color components cannot be rendered because of the spectral overlap or "cross-talk" between the color filters. Nevertheless, the improvements in image brightness provided by wide spectrum, overlapping color filters has made such calorimetric inaccuracies an acceptable characteristic of reflective display systems.

SUMMARY OF THE INVENTION

Accordingly, an improvement in multi-color reflective display systems includes a controllable display cell and multiple non-sequential, typically adjacent, color filters that transmit generally different color components with spectral overlaps between them. The improvement includes a color filter cross-talk compensator that receives image data that corresponds to a display image to be rendered. The color filter cross-talk compensator generates crosstalk compensated color component drive signals that are delivered to the display cell. The cross-talk compensated color component drive signals compensate for the overlapping color components transmitted by the nominal color filters for the generally different color components.

In one implementation, the cross-talk compensator includes an illumination source selector for selecting the ambient light as being one of multiple predefined ambient illumination sources. The cross-talk compensator compensates for the overlapping color components transmitted by the color filters differently according to the ambient illumination source that is selected. For example, the ambient illumination sources may include daylight or interior fluorescent lighting.

Another aspect of the improvement is a multi-color reflective display color filter cross-talk compensation method. In one implementation for displays with nominal red, green and blue color filters, the method includes determining for each color filter a transmittance at each of multiple selected light wavelengths throughout the spectrum. From these transmittances, the relative amounts of red, green and blue light transmitted from each color filter are determined and are normalized with respect to the transmittance of the nominal colors of the filters. Color filter crosstalk compensation factors are determined from the normalized relative color components transmitted from the color filters, and image data signals are applied to the reflective display in accordance with the color filter cross-talk compensation factors.

Additional objects and advantages of the present invention will be apparent from the detailed description of the preferred embodiment thereof, which proceeds with reference to the accompanying drawings.

DETAILED DESCRIPTION OF ILLUSTRATIVE EMBODIMENTS

Figure 1:
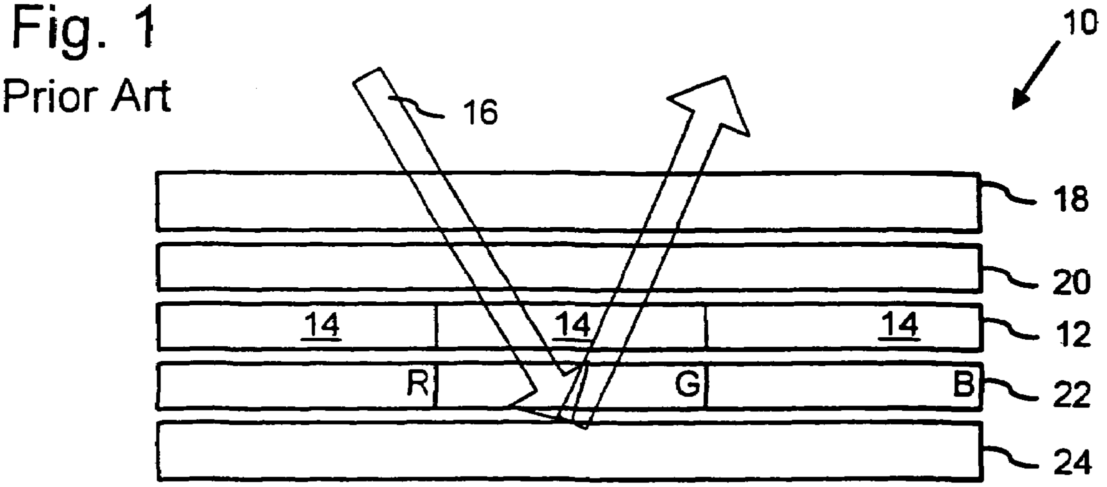
Fig. 1 Prior Art
FIG. 1 is an exploded schematic sectional side view of a portion of a prior art reflective multi-color display panel having a display cell such as a conventional liquid crystal display cell.

FIG. 1 is an exploded schematic sectional side view of a portion of a prior art reflective multi-color display panel 10 having a display cell 12, such as a conventional liquid crystal display cell (e.g., twisted nematic, active matrix, ferroelectric, etc.). Display cell 12 includes multiple pixels 14 that receive display signals and in response to them impart localized changes in optical characteristics (e.g., phase or polarization) within liquid crystal display cell 12. Although only three pixels 14 are illustrated, display cell 12 will typically include a two-dimensional array of an arbitrary number of pixels 14.

Reflective display panel 10 utilizes external or ambient light 16 that passes successively through a transparent cover plate 18, a polarizer/analyzer 20, pixels 14 of display cell 12, and multiple color filters 22. External light 16 is then reflected by a reflector 24 and passes successively back through color filters 22, pixels 14 of display cell 12, polarizer/analyzer 20, and cover plate 18 to be viewed by an observer (not shown). In the illustrated implementation, color filters 22 include arrays of red, green, and blue filters (only one array shown) that allow reflective display panel 10 to render generally full-color display images. As illustrated, color filters 22 are non-sequential relative to each other so that light does not pass successively from one color filter to another.

Image brightness is a common performance limitation in flat panel display systems, particularly display systems employing liquid crystal display cells and color filters. In transmissive display systems that employ illumination from integrated backlights, image brightness can be enhanced by increasing the illumination brightness provided by the backlight. Reflective display panel 10 cannot increase image brightness in this way because ambient light is used for image illumination. As a result, reflective display panel 10 increases image brightness by maximizing the transmittance of color filters 22.

Figure 2:
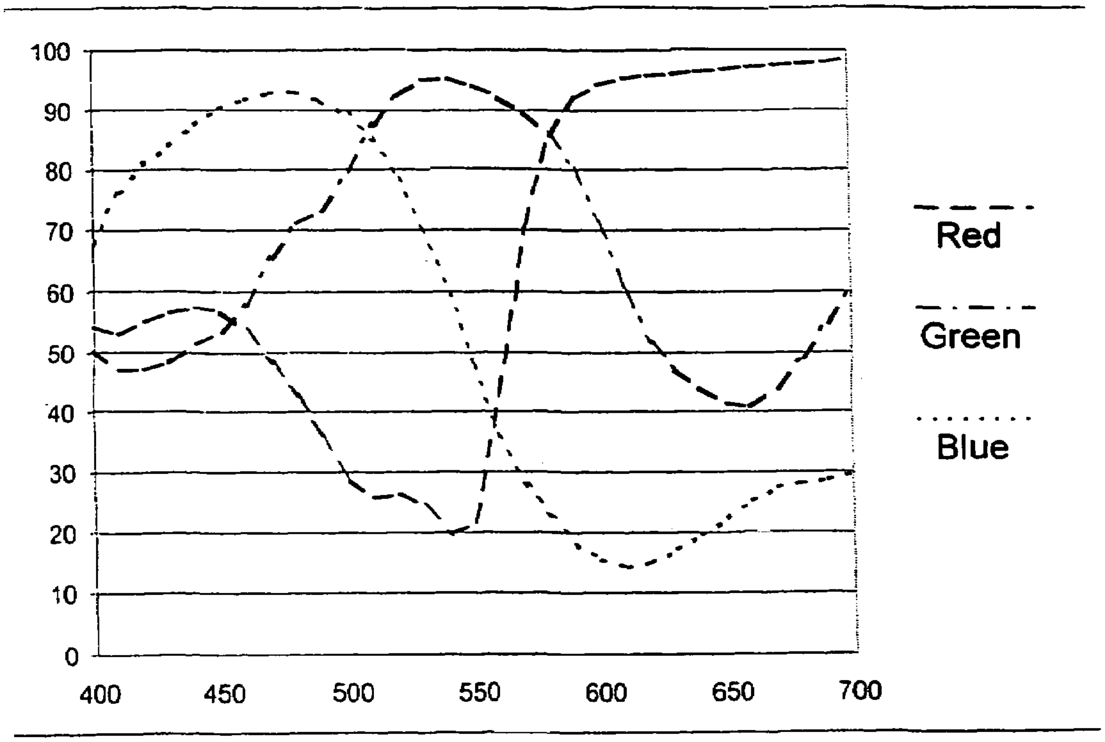
Fig. 2 Prior Art
FIG. 2 is a graph illustrating transmittance of red, green, and blue color filters in an exemplary prior art reflective color display system.

FIG. 2 is a graph illustrating transmittance of red, green, and blue color filters 22 in an exemplary prior art reflective color display system. These transmittance characteristics show that there is considerable overlap in the transmittance of the green and blue filters, and the transmittance of the red and green filters, and modest overlap in the transmittance of blue and red filters. Overlaps in the transmittance of different color filters represent a form of color "cross-talk." Transmission of light through one color filter (e.g., green) will include other color components (e.g., red and blue). As a consequence, maximizing transmittance through color filters 22 causes a loss in color accuracy, saturation, or fidelity.

In comparison to transmissive displays, this loss of color fidelity in reflective display panel 10 is exacerbated in at least two ways. Light 16 passes through color filters 22 twice, before and after being reflected by reflector 24. For incident light of intensity IIN, the intensity of light $I_{OUT}(\mathbf{1})$ passing once through a filter having transmittance characteristics TFILTER may be represented as:

$$I_{OUT}(1)=T_{FILTER}I_{IN}$$

The intensity of light $I_{OUT}(\mathbf{2})$ passing twice through the filter may be represented as:

$$I_{OUT}(2)=T_{FILTER}(T_{FILTER}I_{IN})=T^2{}_{FILTER}I_{IN}$$

As a consequence, the color infidelities are increased by the square of the filter cross-talk in reflective display systems.

In addition, ambient light 16 utilized in reflective display panel 10 can have a wide range of chromatic characteristics. As two examples, typical sunlight will provide generally white illumination, while typical fluorescent office lighting will have exaggerated blue color components. As a consequence, color characteristics of a display image can vary according to the type of ambient light 16 in which the image is viewed. In contrast, the backlight of a conventional transmissive display system will have generally fixed chromatic characteristics that provide uniform image color characteristics in all environments.

Figure 3:
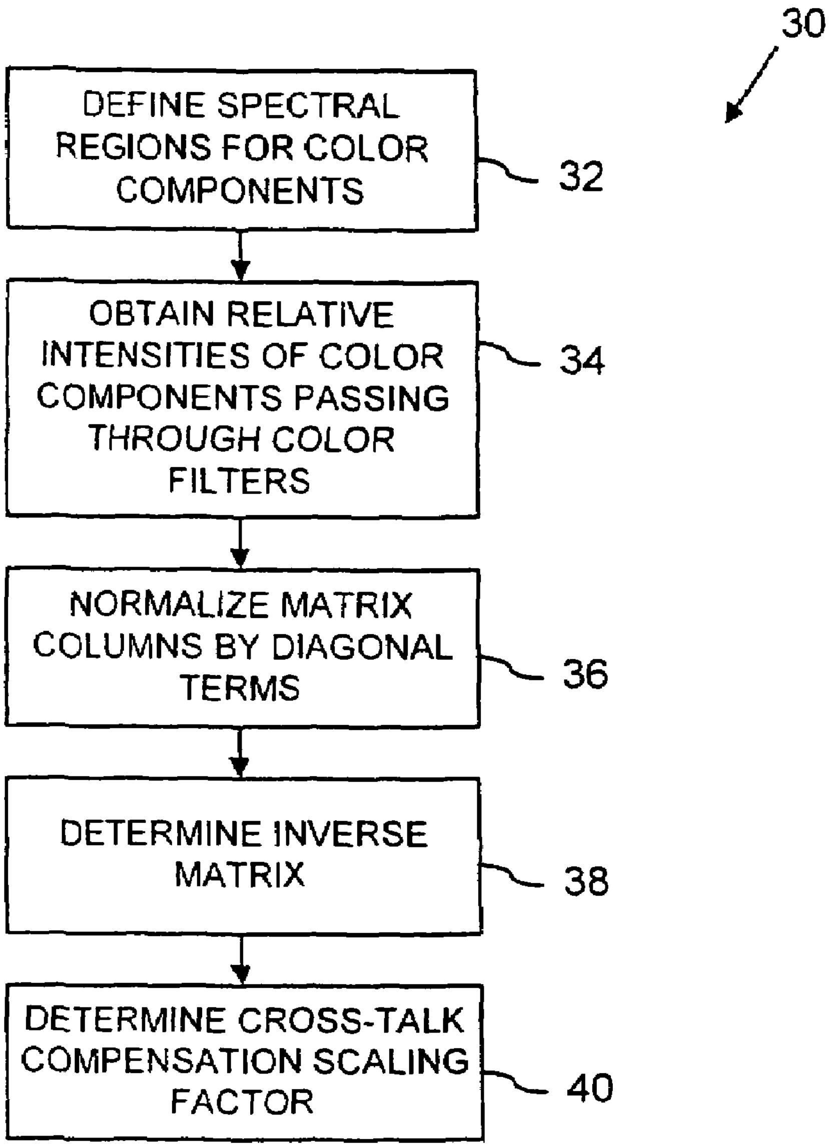
FIG. 3 is a flow diagram of a cross-talk compensation definition method for defining display drive magnitudes to compensate for cross-talk between color filters in a display system.

FIG. 3 is a flow diagram of a cross-talk compensation definition method 30 for defining display drive magnitudes to compensate for cross-talk between color filters in a display system, such as reflective display panel 10.

Process block 32 indicates that a spectral region is defined for each of multiple (e.g., 2 or 3) color components. For example, light of wavelengths in the range of 400 nm to 490 nm can correspond to a blue color component, light in the range of 500 nm to 590 nm can correspond to a green color component, and light in the range of 600 nm to 700 nm can correspond to a red color component.

Process block 34 indicates that relative intensities of the color components passing through each color filter are obtained. These relative intensities may be determined experimentally or may be determined from a color filter transmittance characterization such as that of FIG. 2: For example, with color filters for each of three color components (red, green and blue), each color filter could transmit each color component of light. These many permutations of filters and transmitted color components could be represented by the following terms:

Rr=red segment spectral energy passing through the nominal red filter.

Rg=green segment spectral energy passing through the nominal red filter.

Rb=blue segment spectral energy passing through the nominal red filter.

Gr=red segment spectral energy passing through the nominal green filter.

Gg=green segment spectral energy passing through the nominal green filter.

Gb=blue segment spectral energy passing through the nominal green filter.

Br=red segment spectral energy passing through the nominal blue filter.

Bg=green segment spectral energy passing through the nominal blue filter.

Bb=blue segment spectral energy passing through the nominal blue filter.

Together, these terms can form a linear algebraic matrix M:

$$\begin{vmatrix} R_r & G_r & B_r \\ R_g & G_g & B_g \\ R_b & G_b & B_b \end{vmatrix}$$

It will be appreciated that for idealized color filters with no color cross-talk, only the terms Rr, Gg, and Bb would have non-zero values. This means that an ideal R, G, B filter set would produce an identity matrix:

$$\begin{vmatrix} 1 & 0 & 0 \\ 0 & 1 & 0 \\ 0 & 0 & 1 \end{vmatrix}$$

As described above, intensity of light IOUT(2) passing twice through color filters 22 in reflective display panel 10 is represented as:

$$I_{OUT}(2)=T_{FILTER}(T_{FILTER}I_{IN})=T^2{}_{FILTER}I_{IN}$$

As a result, the values of the red color filter terms in matrix, M, can be calculated as follows, and the values of the blue and green color filter terms in matrix, M, can be calculated in a corresponding manner.

$$R_r = \sum_{\lambda=600}^{\lambda=700} R_\lambda^2 \tag{1}$$

$$R_g = \sum_{\lambda=500}^{\lambda=590} R_\lambda^2 S_\lambda \tag{2}$$

$$R_b = \sum_{\lambda=400}^{\lambda=490} R_\lambda^2 S_\lambda \tag{3}$$

λ=The wavelength of the light in nanometers.

$R_\lambda$=Spectral transmittance of the red filter at the indexed wavelength.

$G_\lambda$=Spectral transmittance of the green filter at the indexed wavelength.

$B_\lambda$=Spectral transmittance of the blue filter at the indexed wavelength.

$S_\lambda$=Spectral component of the light source at the indexed wavelength.

For example, the relative intensities of daylight can be represented by the following Table in wavelength increments of 10 nm:

| Wavelength (nm) | Sunlight Relative Intensity | Fluorescent Relative Intensity |
|---|---|---|
| 400 | 0.4000 | 0.0400 |
| 410 | 0.4400 | 0.0600 |
| 420 | 0.5000 | 0.0800 |
| 430 | 0.5900 | 0.2000 |
| 440 | 0.6500 | 0.6000 |
| 450 | 0.7100 | 0.2300 |
| 460 | 0.7500 | 0.2400 |
| 470 | 0.7900 | 0.2500 |
| 480 | 0.8200 | 0.3100 |
| 490 | 0.8500 | 0.3400 |
| 500 | 0.8900 | 0.3200 |
| 510 | 0.9300 | 0.2700 |
| 520 | 0.9600 | 0.2700 |
| 530 | 0.9750 | 0.3000 |
| 540 | 0.9850 | 0.4000 |
| 550 | 1.0000 | 1.0000 |
| 560 | 0.9900 | 0.4700 |
| 570 | 0.9800 | 0.4500 |
| 580 | 0.9650 | 0.5500 |
| 590 | 0.9450 | 0.3900 |
| 600 | 0.9150 | 0.3700 |
| 610 | 0.8800 | 0.3400 |
| 620 | 0.8450 | 0.2700 |
| 630 | 0.8050 | 0.2100 |
| 640 | 0.7550 | 0.1600 |
| 650 | 0.7000 | 0.1300 |
| 660 | 0.6400 | 0.0900 |
| 670 | 0.5750 | 0.0700 |
| 680 | 0.5250 | 0.0500 |
| 690 | 0.4500 | 0.0400 |
| 700 | 0.3900 | 0.0300 |

As an example, the matrix M computed for the color filters represented by the transmittances in FIG. 2 as summations at wavelength increments of 10 nm using a daylight light source results in the following matrix:

| | | |
|---|---|---|
| 6.9228 | 2.0736 | 0.3372 |
| 2.5139 | 7.6865 | 3.3058 |
| 1.6728 | 2.2730 | 4.9863 |

As can be seen from the data, the off-diagonal terms are far from zero as would be the case for the ideal filter set. In fact the $B_g$ sum is about 66% of the $G_g$ value.

It will be appreciated that the relative intensities of the color components passing through each color filter represented by equations (1)-(3) above may be summed over unit steps of wavelengths as indicated or may be summed at other wavelength sample steps (e.g., wavelength increments of 10 nm or other increments), thereby resulting in one-tenth as many or fewer summation terms. The reference to different spectral components by wavelength is interchangeable with references to their frequencies. Computing the relative intensities as summations represents a practical approximation to the precise integral calculation over the given range.

Process block 36 indicates that each column in matrix M is normalized with respect to its diagonal term. This provides the proper scaling so that the off-diagonal values are relative to an ideal matrix whose diagonal values are 1.0. The resulting exemplary column-normalized matrix is:

| | | |
|---|---|---|
| 1.0000 | 0.2698 | 0.0676 |
| 0.3631 | 1.0000 | 0.6630 |
| 0.2416 | 0.2957 | 1.0000 |

Process block 38 indicates that an inverse matrix is determined for the column-normalized matrix, M. This gives a matrix that can be used to back out or compensate for the cross-talk within the dynamic range of the display. The resulting exemplary inverse column-normalized matrix is:

| | | |
|---|---|---|
| 1.0862 | −0.3375 | 0.1503 |
| −0.2742 | 1.3290 | −0.8626 |
| −0.1814 | −0.3115 | 1.2199 |

Process block 40 indicates that a cross-talk compensation scaling factor is determined from the inverse column-normalized matrix. In one implementation, the scaling factor preserves the gray scale and maintains the proper image color balance. For example, with an 8-bit digital value for each color component, maximum input values of R1=255, G1=255 and B1=255 for white light should provide cross-talk compensated output values RN, GN and BN with white output. (It will be appreciated that the maximum color component value is arbitrary and 255 is merely an example.) With 255 used as the input values, then the following results occur:

$$R_N=R_I\times1.0862+G_I\times(-0.2742)+B_I\times(-0.1814)$$

$$G_N=R_I\times(-0.3375)+G_I\times1.3290+B_I\times(-0.3115)$$

$$B_N=R_I\times0.1503+G_I\times(-0.8626)+B_I\times1.2188$$

$$R_N=255\times1.0862+255\times(-0.2742)+255\times(-0.1814)=161$$

$$G_N=255\times(-0.3375)+255\times1.3290+255\times(-0.3115)=173$$

$$B_N=255\times0.1503+255\times(-0.8626)+255\times1.2188=129$$

It will be appreciated that in the illustrated reflective displays, colors are combined in an additive manner by which color components are added together to provide a desired color. In the exemplary 8-bit digital value range, the maximum input values for the color components are RN, GN, and BN are each 255, and the minimum input values for the color components are RN, GN, and BN are each 0. In some instances, the cross-talk compensated color component values may fall outside this range of practical color component values.

For example, a full-intensity blue input represented as ($R_I$, $G_I$, $B_I$) equal to (0, 0, 255) would result in possible cross-talk compensated values of ($R_N$, $G_N$, $B_N$) equal to (−36, −62, 244). Being less than the minimum zero value, the negative red and green cross-talk compensated values could not actually be generated by the reflective display system. As a result, such an out-of-range compensated value would be truncated to the nearest in-range values, resulting in the cross-talk compensated values of ($R_N$, $G_N$, $B_N$) being equal to (0, 0, 244). As another example, a bright magenta input represented as ($R_I$, $G_I$, $B_I$) equal to (200, 0, 200) would result in possible cross-talk compensated values of ($R_N$, $G_N$, $B_N$) equal to (181, −130, 274). With the −130 and 274 values being outside the respective minimum and maximum system values, such out-of-range compensated values would be truncated to the nearest in-range values, resulting in the cross-talk compensated values of ($R_N$, $G_N$, $B_N$) being equal to (181, 0, 255).

Figure 4:
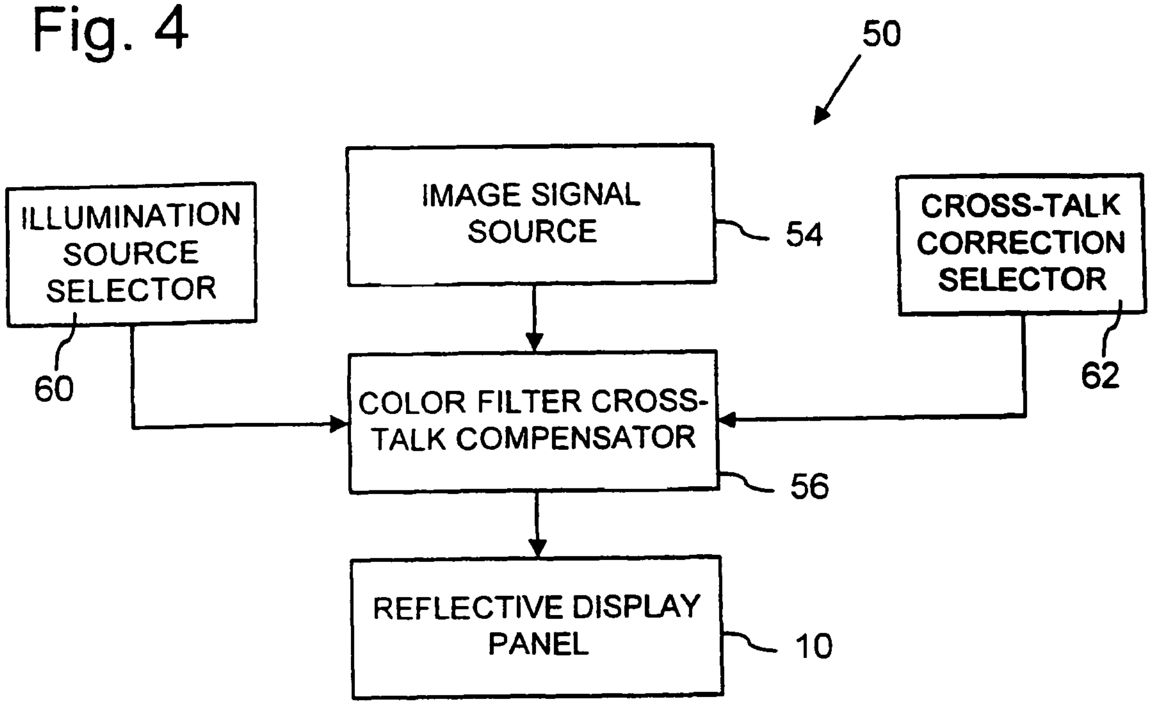
FIG. 4 is a functional block diagram of a reflective flat panel multi-color display system.

FIG. 4 is a functional block diagram of a reflective flat panel multi-color display system 50. Display system 50 includes a display panel 10, or an analogous reflective display panel, capable of separately rendering multiple pixels in each of multiple (e.g., red, green and blue) color components. Display panel 10 generates display images based upon conventional color component drive signals generated from an image signal source 54. Typically, the conventional color component drive signals will include color component magnitude signals for each of plural (e.g., red, green, and blue) color components and will correspond to an image to be imparted by display system 50.

Display system 50 further includes a color filter cross-talk compensator 56 that receives the conventional color component drive signals and generates cross-talk compensated color component drive signals that are delivered to display panel 10, or an analogous reflective display panel. The cross-talk compensated color component drive signals may be generated in accordance with cross-talk compensation scaling factors, as obtained by compensation definition method 30. As a result, display system 50 with color filter cross-talk compensator 56 functions to preserve the image gray scale and maintain the proper image color balance.

Display system 50 is shown with an optional illumination source selector 60 for selecting or indicating the ambient illumination under which display system is being used and viewed. Illumination source selector 60 provides to cross-talk compensator 56 an indication of which of two or more predetermined forms of illumination is being provided to display system 50 as ambient light. In one implementation, the two or more predetermined forms of illumination include daylight and interior fluorescent lighting characteristic of many commercial environments. It will be appreciated that the predetermined forms of illumination could alternatively or additionally include conventional incandescent lighting, halogen lighting, reduced (evening) lighting, etc.

Cross-talk compensator 56 generates cross-talk compensated color component drive signals in accordance with the illumination type indicated by illumination source selector 60. As described above with reference to the determination of the color filter cross-talk matrix, an aspect of the cross-talk characteristics is the character of the illumination light passing through the color filters. Different cross-talk compensation factors will be generated for different illumination types. As a result, illumination source selector 60 allows cross-talk compensator 56 to utilize cross-talk compensation factors corresponding to the illumination type indicated by illumination source selector 60. In one implementation, the cross-talk compensation factors corresponding to each illumination type are predetermined and stored within or may be accessed by cross-talk compensator 56. It will be appreciated that the cross-talk compensation factors corresponding to each illumination type could alternatively be calculated within cross-talk compensator 56.

In one implementation, illumination source selector 60 is a switch (mechanical, software-controlled, etc.) by which a user manually selects an illumination type under which display system 50 is being used or viewed. In another implementation, illumination source selector 60 may include 2 or 3 color component sensors (e.g., photodetectors) positioned behind corresponding color component filters (e.g., any 2 or all 3 of red, green and blue) that preferably have minimized cross-talk characteristics. Based upon relative intensities of light received at the 2 or 3 color component sensors, illumination source selector 60 makes a best determination of which one of the predetermined illumination types is present.

Display system 50 is also shown with an optional cross-talk compensation selector 62 for selecting or indicating an extent to which the cross-talk compensation scaling factors are to be applied. A viewer may not want maximum compensation at times, since colors can saturate and some tonal scale can be lost in very bright colors with maximum compensation. Cross-talk compensation selector 62 provides to cross-talk compensator 56 an indication of how to scale the off-diagonal inverse matrix values by a factor of between zero and one (i.e., no compensation or 100% compensation), with scaling terms of 50%-70% commonly being desired to reduce the compensation but improve tonal scale. For example, the exemplary inverse column-normalized matrix above with a 70% compensation scaling factor would be represented as:

| | | |
|---|---|---|
| 1.0862 | −0.2363 | 0.1052 |
| −0.1919 | 1.3290 | −0.6038 |
| −0.1270 | −0.2181 | 1.2199 |

Cross-talk compensation selector 62 may be implemented as a switch (mechanical, software-controlled, etc.) by which a user manually selects an extent of compensation and may be integral with or separate from illumination source selector 60.

Having described and illustrated the principles of an embodiment of the invention, it will be recognized that the illustrated embodiment can be modified in arrangement and detail without departing from such principles. For example, the invention has been described in relation to generally full-color display systems employing red, green, and blue color components. It will be appreciated, however, that this invention is similarly applicable to any multi-color display system employing at least two different color components. In view of the many possible embodiments to which the principles of the invention may be applied, it should be recognized that the detailed embodiments are illustrative only and should not be taken as limiting the scope of our invention. Rather, all such embodiments as may come within the scope and spirit of the following claims and equivalents thereto are claimed.

What is claimed:

1. In a multi-color reflective display system having a controllable display cell with plural non-sequential color filters that transmit different color components with spectral overlaps between them, the display cell forming a display image from image data provided by an image data source, a color filter cross-talk compensator, comprising:

a device for receiving the image data and applying cross-talk compensated color component drive signals, the drive signals compensating for the spectral overlaps, the device obtaining for nominal first, second and third color component color filters relative amounts of each of the first, second and third color components of light that is passed and determining the cross-talk compensated color component drive signals based on color filter cross-talk compensation factors from the relative amounts of the first, second and third color components of light that are passed for the nominal first, second and third color component color filters; and an illumination source selector switch adapted to provide selection of an illumination type used in the display system, the device also for selectively applying the determined cross-talk compensation factors by a user-selected proportion and applying the proportion to non-diagonal terms of a matrix.

2. The compensator of claim 1, wherein the color components with spectral overlaps between them are adjacent to one another.

3. The compensator of claim 1, wherein ambient light is transmitted into the display cell and reflects back through it.

4. The compensator of claim 3, wherein the ambient light is at least one of natural light and fluorescent light.

5. The compensator of claim 1, wherein the color components comprise red, green, and blue.

6. The compensator of claim 1, wherein the device applies cross-talk compensated color component drive signals based on cross-talk compensation factors accessed by the compensator.

7. The compensator of claim 1, wherein the illumination type used in the display system is daylight.

8. In a multi-color reflective display system having a controllable display cell with plural non-sequential color filters that transmit different color components with spectral overlaps between them, ambient light being transmitted into the display cell and reflected back through it, the display cell forming a display image in accordance with image data provided by an image data source, a color filter cross-talk compensation method, comprising:

receiving the image data provided by the image data source;

obtaining for nominal first, second and third color component color filters relative amounts of each of the first, second and third color components of light that is passed;

generating cross-talk compensated color component drive signals that are delivered to the display cell, the cross-talk compensated color component drive signals compensating for the overlapping color components transmitted by the color filters for the different color components, the generated cross-talk compensated color component drive signals being based on color filter cross-talk compensation factors from the relative amounts of the first, second and third color components of light that are passed for the nominal first, second and third color component color filters;

receiving a selection of an illumination type used in the display system; and selectively applying the cross-talk compensation factors by a user-selected proportion and applying the proportion to non-diagonal terms of a matrix.

9. The method of claim 8, further comprising:

determining for a selected ambient light a relative intensity at each of plural selected light wavelengths or frequencies.

10. A computer-readable medium having computer-executable instructions for performing steps, comprising:

obtaining for nominal first, second and third color component color filters relative amounts of each of the first, second and third color components of light that is passed;

determining color filter cross-talk compensation factors from the relative amounts of the first, second and third color components of light that are passed for the nominal first, second and third color component color filters;

receiving a selection of an illumination type used in a display system, wherein the result from the obtaining, the determining, and the receiving steps is for viewing on the display system; and selectively applying the cross-talk compensation factors by a user-selected proportion and applying the proportion to non-diagonal terms of a matrix.

11. The computer-readable medium of claim 10, having further computer-executable instructions for performing the step of:

normalizing the relative amounts of the first, second and third color components of light that are passed for the nominal first, second and third color component color filters to determine the color filter cross-talk compensation factors.

12. The computer-readable medium of claim 10, having further computer-executable instructions for performing the step of:

applying image data signals to a reflective display in accordance with the color filter cross-talk compensation factors.

13. The computer-readable medium of claim 10, wherein determining color filter cross-talk compensation factors from the relative amounts of the first, second and third color components of light that are passed for the nominal first, second and third color component color filters comprises representing the relative amounts in a linear algebraic matrix.

14. The computer-readable medium of claim 10, having further computer-executable instructions for performing the step of:

obtaining a transmittance at each of plural selected light wavelengths or frequencies over a spectrum for the nominal first, second and third color component color filters.

15. The computer-readable medium of claim 10, wherein determining color filter cross-talk compensation factors comprises:

normalizing matrix columns by diagonal terms, resulting in a normalized matrix; and determining an inverse matrix of the normalized matrix.

16. The method of claim 9, wherein the relative intensity at each of the plural selected light wavelengths or frequencies is determined from a color filter transmittance characterization.

17. The method of claim 8, wherein the ambient light is at least one of natural light and fluorescent light.

* * * * *